United States Patent
Kingsbury et al.

(10) Patent No.: US 10,882,036 B2
(45) Date of Patent: Jan. 5, 2021

(54) SUBSTRATE AND A METHOD OF MANUFACTURING A SUBSTRATE

(71) Applicant: Imperial Innovations Limited, London (GB)

(72) Inventors: Benjamin Francis Knatchbull Kingsbury, Tunbridge Wells (GB); Kang Li, Banstead (GB); Zhentao Wu, Sutton (GB)

(73) Assignee: IP2IPO Innovations Limited, London (GB)

( * ) Notice: Subject to any disclaimer, the term of this patent is extended or adjusted under 35 U.S.C. 154(b) by 0 days.

(21) Appl. No.: 14/917,221

(22) PCT Filed: Sep. 5, 2014

(86) PCT No.: PCT/GB2014/052698
§ 371 (c)(1),
(2) Date: Mar. 7, 2016

(87) PCT Pub. No.: WO2015/033157
PCT Pub. Date: Mar. 12, 2015

(65) Prior Publication Data
US 2016/0214099 A1    Jul. 28, 2016

(30) Foreign Application Priority Data
Sep. 5, 2013 (GB) .................... 1315841.5

(51) Int. Cl.
*B01J 35/04* (2006.01)
*C04B 38/04* (2006.01)
(Continued)

(52) U.S. Cl.
CPC ............... *B01J 35/04* (2013.01); *B01J 21/04* (2013.01); *B01J 23/10* (2013.01); *B01J 35/023* (2013.01);
(Continued)

(58) Field of Classification Search
CPC ............ C04B 35/63492; C04B 35/636; C04B 2235/6021; C04B 2235/3481;
(Continued)

(56) References Cited

U.S. PATENT DOCUMENTS 3,819,439 A    6/1974   Taylor
4,130,452 A *  12/1978  Indri ...................... B01D 53/34
                                                          156/155
(Continued)

FOREIGN PATENT DOCUMENTS

DE    3536309    6/1986
EP    2357440    8/2011
(Continued)

OTHER PUBLICATIONS

Rahman, M.A., "Development of a Catalytic Hollow Fibre Membrane Microreactor as a Microreformer Unit for Automotive Application" Journal of Membrane Science, vol. 390, 2011 pp. 68-75.
(Continued)

*Primary Examiner* — Anthony J Zimmer
*Assistant Examiner* — Syed T Iqbal
(74) *Attorney, Agent, or Firm* — GableGotwals (57) ABSTRACT

A substrate and a method of manufacturing a catalytic substrate body arranged within the catalytic convertor such that a principal flow of fluid through the catalytic convertor flows along a surface of the substrate body, wherein said surface has a plurality of openings to micro-channels that extend away from said surface; and at least a portion of the surface of the substrate body comprises a catalytically active material, wherein the substrate body is in the form of a pellet; a sheet; solid elongated bodies; solid rods; a solid body having a plurality of bores; a non-tubular elongated body; a non-hollow body; a sheet curved in the form or a spiral; or a combination thereof.

20 Claims, 5 Drawing Sheets

(51) Int. Cl.
*F01N 3/28* (2006.01)
*B01J 21/04* (2006.01)
*B01J 23/10* (2006.01)
*B01J 35/02* (2006.01)
*B01J 37/00* (2006.01)
*B01J 37/02* (2006.01)
*B01J 37/08* (2006.01)
*C04B 111/00* (2006.01)

(52) U.S. Cl.
CPC ....... *B01J 37/0018* (2013.01); *B01J 37/0215* (2013.01); *B01J 37/08* (2013.01); *C04B 38/04* (2013.01); *F01N 3/2814* (2013.01); *F01N 3/2825* (2013.01); *C04B 2111/0081* (2013.01); *F01N 2330/06* (2013.01)

(58) Field of Classification Search
CPC .... C04B 2235/3409; C04B 2235/3445; C04B 2235/3217; C04B 35/6365; C04B 35/63448; C04B 38/0006; C04B 2111/0081; C04B 2235/3287; C04B 2235/3418; C04B 35/195; C04B 2235/3232; C04B 35/06; B01D 2046/2437; B01D 46/2429; B01D 46/244; B01D 46/2444; B01D 2046/2433; B01D 46/2474; B01D 2279/30; F01N 2330/16; F01N 3/2828; B01J 37/0018; B01J 35/04; Y10T 428/24157; Y10T 428/24149
See application file for complete search history.

(56) References Cited

U.S. PATENT DOCUMENTS

| | | | | |
|---|---|---|---|---|
| 4,175,153 | A * | 11/1979 | Dobo | B01D 53/22 210/510.1 |
| 5,352,481 | A | 10/1994 | Bak et al. | |
| 6,887,809 | B1 | 5/2005 | Adler | |
| 8,294,040 | B2 | 10/2012 | Shimizu et al. | |
| 2005/0069469 | A1* | 3/2005 | Fu | B01D 46/2429 422/177 |
| 2005/0100470 | A1 | 5/2005 | Lefebvre et al. | |
| 2007/0225532 | A1 | 9/2007 | Tonkovich et al. | |
| 2008/0241032 | A1 | 10/2008 | Zuberi | |
| 2011/0217215 | A1* | 9/2011 | Vakkilainen | B01D 53/865 423/213.2 |
| 2011/0274601 | A1* | 11/2011 | Boorse | B01D 53/9431 423/213.2 |
| 2012/0186736 | A1 | 7/2012 | Yoshioka et al. | |
| 2012/0247084 | A1* | 10/2012 | Atluri | F01N 3/2013 60/274 |

FOREIGN PATENT DOCUMENTS

| | | |
|---|---|---|
| GB | 2502953 | 12/2013 |
| JP | 06106035 | 9/1992 |
| JP | 2005307944 | 11/2005 |
| JP | 2010104928 | 5/2010 |
| WO | 02055189 | 7/2002 |
| WO | 03070662 | 8/2003 |
| WO | 2007007051 | 1/2007 |
| WO | 2013175239 | 11/2013 |

OTHER PUBLICATIONS

Xiaoyao Tan et al., "Preparation of LSCF Ceramic Hollow-Fiber Membrane for Oxygen Production by a Phase-Inversion/Sintering Technique", Materials and Interfaces, Ind. Eng. Chem. Res. 2005, 44, 61-66.

Zhigang Wang et al., "Preparation and Oxygen Permeation Properties of Highly Asymmetric La 0.6 Sr0.4 Co0.2 Fe0.8O3—a Perovskite Hollow-Fiber Membranes", Separations, Ind. Eng. Chem. Res. 2009, 48, 510-516.

Lihong Liu et al., "Yttria Stabilized Zircona Hollow Fiber Membranes", J. Am. Ceram. Soc. 89, 3, 1156-1159 2006.

Naitao Yang et al., "A Phase inversion/sintering process to fabricate nickel/yttria-stabilized zirconia hollow fibers as the anode support for micro-tubular solid oxide fuel cells", Journal of Power Sources, 183, 2008,14-19.

Xiaoyao Tan el al., "Preparation and characterization of inorganic hollow fiber membranes", Journal of Membrane Science, 188, 2001, 87-95.

"New ceramic hollow fiber substrate for catalytic converters cuts fuel consumption, size and manufacturing costs", Green Car Congress, Jan. 28, 2014, online at: https://www.greencarcongress.com/2014/01/20140128-kingsbury.html.

* cited by examiner

SUBSTRATE AND A METHOD OF MANUFACTURING A SUBSTRATE

CROSS-REFERENCE TO RELATED APPLICATIONS

This application is the United States National Phase of PCT Patent Application No. PCT/GB2014/052698 filed 5 Sep. 2014, which claims priority to Great Britain Application No. 1315841.5 filed 5 Sep. 2013, which are incorporated herein by reference.

BACKGROUND OF THE INVENTION

Known catalytic converters consist of a ceramic honeycomb monolith substrate and a platinum group metal (PGM) catalytically active coating.

The effectiveness of this arrangement on exhaust gases is determined by the geometric surface area of the ceramic honeycomb monolith substrate, which is limited by its effect on the pressure drop as the flow of exhaust gas passes the substrate; the conventional approach to increasing surface area is to provide more passages through the monolith substrate, but this requires narrower passages.

The maximum geometric surface area of a monolith substrate achieved to date is a figure approaching 5000 $m^2/m^3$ for automotive applications.

It is an object of the present invention to provide an improved substrate for a catalytic converter, having a high geometric surface area and offering beneficial flow dynamics.

Hollow fibre membranes have been used in the following papers; Wang et al (2009), Industrial & Chemical Engineering Research 48, 510; Tan et al, Preparation and characterisation of inorganic hollow fibre membranes, J Membr Sci, 2001, 188: 87-95; Preparation of LSCF ceramic hollow fibre membranes for oxygen production by a phase-inversion/sintering technique. Ind Eng Chem Res, 2005, 44: 61-66; Yttria stabilised zirconia hollow fiber membranes. J Am Ceram Soc 2006, 89: 1156-1159 and A phase inversion/sintering process to fabricate nickel/yttria-stablished zirconia hollow fibers as the anode support for micro-tubular solid oxide fuel cells, J Power Sources, 2008, 183; 14-19. In these applications, the oxygen permeability/conductivity of the tubes are of great benefit.

The inventors have discovered that the material from which the hollow fibre membranes are manufactured provides a large surface area that can be advantageous in other applications.

According to the invention, there are provided catalytic convertors and methods of manufacture of catalytic convertor substrates as defined by the appended claims.

Embodiments of catalytic convertors in accordance with the invention comprise a substrate body having a surface arranged within the catalytic convertor such that a principal flow of fluid through the catalytic convertor flows along a surface of the substrate body. The principal flow of fluid is the flow of the bulk of fluid as it passes through the catalytic convertor. In addition to the principal flow of fluid, there may be additional eddies of fluid. However, the eddies are not to be considered part of the principal flow.

The principal flow of fluid through the catalytic convertor flows along a surface of the substrate body such that it travels in a direction substantially parallel to said surface and in contact therewith.

For example, the catalytic convertor may comprise a housing having an inlet and an outlet, which houses the substrate body. The principal flow will be from the inlet to the outlet. A portion of the principal flow will be along the surface of the substrate body.

The catalytic convertor substrate may comprise one or more substrate bodies. A co-pending application GB1209155.9, the full disclosure of which is incorporated herein by reference, has been directed to the manufacture of tubular substrate bodies by extrusion. The present application describes a method of manufacturing a larger variety of substrate geometries and is not therefore limited to simple extruded shapes.

The present application is thus directed to forms of substrate geometry other than the tubular form described in GB1209155.9. That is, the catalytic convertor substrate does not comprise one or more micro-structured tubes.

Such geometries may include one or more or combinations of: pellets; sheets; solid rods; a solid body having a plurality of bores; non-tubular bodies; solid/non-hollow bodies; or a curved sheet in the form of a spiral (for example, a sheet wound to form a spiral in cross-section having a gap between each roll of the spiral).

Preferably, a substrate body is provided in the form of a sheet with two major planar surfaces, which may be flat or curved. The sheet may have a constant thickness perpendicular to its major surfaces, or its thickness may vary. The sheet may be provided with textured major surfaces and/or have surface structures protruding from its major surfaces.

The catalytic convertor substrate of the embodiments described herein can have such a large surface area that optionally less catalyst is required for high performance. As such, it is not necessary for the entire substrate body to be coated. Preferably, at least a portion of the substrate body has a coating of catalytically active material.

However, alternative embodiments are considered in which the substrate body itself comprises a catalytically active material. This can be achieved in the method described below by including a catalytically active material in the suspension that is shaped (by moulding or extruding) to form a green body.

Preferably, the substrate is coated with a catalytically active coating, such as a washcoat.

Preferably, the micro-structured substrate is ceramic.

The micro-channels may terminate within the substrate or extend from one surface to another surface.

The micro-structured substrate may be fabricated using a combined phase inversion and sintering technique described below. Advantageously, this allows the choice of materials to be based on factors that improve the mechanical, thermal and chemical properties of the substrate and improve the compatibility with the catalytically active material.

In a preferred embodiment the micro-channels have an entrance diameter of 5 μm to 200 μm.

If the substrate is formed as a sheet, the micro-channels preferably extend at least 30% of the sheet thickness. More preferably, the micro-channels extend at least 80% of the sheet thickness.

A catalytically active coating may be applied to some or all of the substrate. In some embodiments, the catalytically active coating may completely cover the substrate. If the substrate is formed as a sheet, the catalytically active coating may completely cover one or both of the major surfaces of the substrate sheet. The coating will not obstruct the openings of the micro-channels, but will coat the inner surface thereof.

In a preferred embodiment the catalytically active material comprises a precious metal. However, the GSA provided by the micro-structured substrate can be large enough that only a small quantity of catalyst is required.

In a preferred embodiment the precious metal is palladium or a platinum group metal.

The substrates described below can be prepared in a cost effective and efficient way. Using the phase inversion and sintering technique, substrates can be prepared from a wide range of materials. Moreover, the formation mechanism for high GSA micro-channels is independent of material.

For a better understanding of the invention, and to show how the same may be put into effect, reference will now be made, by way of example only, to the accompanying drawings in which:

FIGS. 1A to 1D show a first embodiment of a method of manufacturing a catalytic convertor substrate.

Figure 1A:
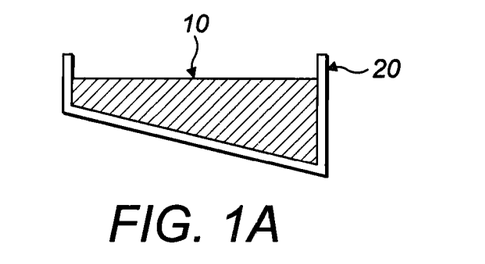
FIG. 1 shows a method of manufacturing a catalytic convertor substrate.

As can be seen in FIG. 1A, the method comprises forming a suspension 10 and introducing the suspension into a mould 20.

The suspension 10 may contain a substrate material in particulate form and a polymer in a first solvent. In some embodiments the suspension 10 may also contain a catalytically active material.

Preferably, the substrate material may comprise one or more of: a ceramic; cordierite; zirconia; yttrium-stabilised zirconia; titania; silicon carbide; clay; alumina; stainless steel, FeCr alloys; alloys of iron; alloys of aluminium; aluminium titanate; or sintered metals.

Preferably, the polymer may comprise one or more of: polyether sulfone; polysulphone; cellulose and its derivatives; polyetherimide; polyimide and its derivatives; PVDF.

Preferably, the first solvent may comprise one or more of: dipolar aprotic solvents; N-methyl-2-pyrrolidone; or dimethyl sulfoxide.

The mould 20 can have any shape. Preferably, the mould 20 is in the form of a tray, so that the suspension 10 when introduced to the mould 20 forms a sheet.

A mould 20 having a constant thickness perpendicular to its major surfaces is envisaged. However, as shown in FIG. 1, the mould 20 may be shaped and/or orientated so that the suspension 10 when introduced to the mould 20 forms a sheet with a thickness that increases across its width/length.

Figure 1B:
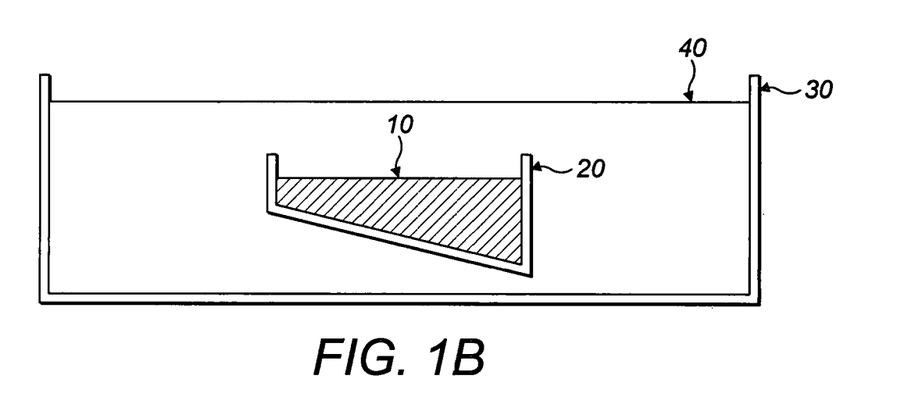

As can be seen in FIG. 1B, the method comprises contacting the suspension 10 in the mould 20 with a second solvent 40.

Preferably, the first solvent is miscible with the second solvent 40.

This may be done by immersing the mould 20 and suspension 10 in a bath 30 of the second solvent 40. The second solvent 40 may displace some or all of the first solvent in the suspension 10. Optionally, the fluid in the bath 30 (which may after a period include a mixture of first and second solvents) may be replaced periodically or at a constant flow rate (for example, to preserve the concentration of the second solvent).

The displacement of some or all of the first solvent by contacting the suspension 10 with a second solvent 40 may remove at least some of the first solvent from the suspension 10 to thereby form a green body 15 formed of the substrate material and the polymer.

When the suspension 10 contacts the second solvent 40, at least some of the first solvent will leave the suspension 10 via its exposed surface. In doing so, it forms micro-cannels in the suspension 10. (such as those described with reference to FIG. 4). The micro-channels can penetrate a large distance through the substrate, but it has been discovered that they will not form openings in the surfaces of the substrate contacting the mould 20.

The green body 15 will have formed therein micro-channels (described below), which are created by the egress of the first solvent.

Figure 1C:
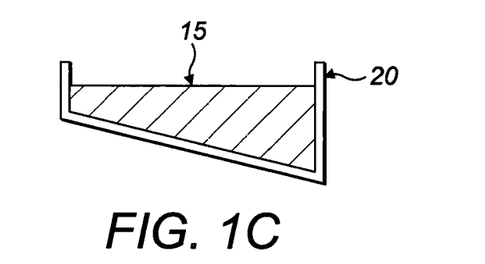

As shown in FIG. 1C, the method may comprise removing the mould 20 from the second solvent 40. This may be done after a period of time (for example, 48 hours). The green body 15 can then be removed from the mould 20.

The micro-channels formed by the contact between the second solvent 40 and the suspension 10 are at the surface of the suspension 10 that is exposed. The micro-channels will penetrate the green body 15 to close to the opposite side of the green body 15.

Figure 1D:
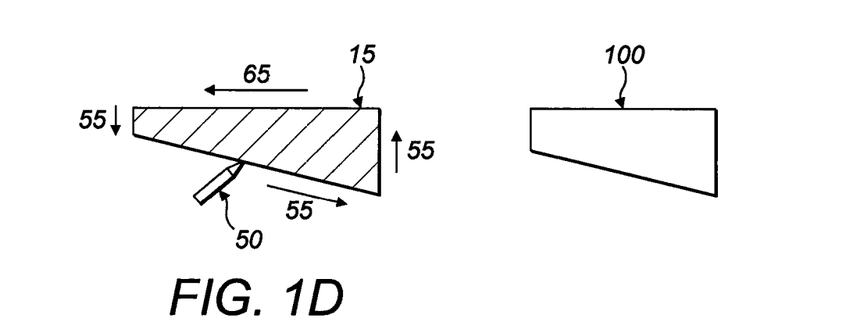

As depicted in FIG. 1D by arrows 55, the method may comprise removing at least a portion of a surface layer of the green body 15 from one or more of the sides of the green body 15 that contacted the mould 20.

When the mould 20 is, for example, a tray, the green body 15 is in the form of a sheet in which a first major surface of the sheet contacted the second solvent 40, while a second major surface of the sheet did not. The method may comprise removing at least a portion of the second major surface layer of said green body 15. Such a method would result in a substrate sheet having openings to micro-channels on both major surfaces.

The inventors have also discovered that the micro-channels resulting from this method may be tapered so as to have a greater width at a greater depth. Thus a larger opening can be obtained by removing a surface layer having smaller openings at the first surface of the green body 15.

Therefore, as depicted in FIG. 1D by arrow 65, the method may advantageously also comprise removing at least a portion of a surface layer of the green body 15 from one or more of the sides of the green body 15 that were exposed to the second solvent 40.

When the mould 20 is, for example, a tray, the green body 15 is in the form of a sheet in which a first major surface of the sheet contacted the second solvent 40, while a second major surface of the sheet did not. The method may additionally comprise removing at least a portion of the first major surface layer of said green body 15.

The resulting green body 15 may then be sintered to form a final substrate body 100.

At least a portion of the substrate body 100 may then be coated with a catalytically active coating.

Possible ways of carrying out the step of removing at least a portion of a surface layer may include: removing at least a portion of a surface layer by applying heat; removing at least a portion of a surface layer with a blade; removing at least a portion of a surface layer with an abrasive; sanding at least a portion of the surface of the green body; contacting the surface of the green body with a solvent, water, a mixture of solvents, an acidic solution, or a basic solution.

Preferably, removing at least a portion of a surface layer can comprise thermolysing at least a portion of the surface of the green body. The thermolysed surface portion will simply fall away from the green body.

Alternatively, or in addition, it may be possible to remove at least a portion of a surface layer after sintering. For example, by applying an abrasive; sanding at least a portion of the surface of the sintered body; or contacting the surface of the sintered body with acidic solution or alkaline solution.

Advantageously, the mould 20 may be shaped such that the substrate body 100 formed by the above process has provided on at least a portion of its surface one or more of: protrusions, surface textures, ridges, and other structures for modifying the flow of fluid over the surface.

Figure 4:
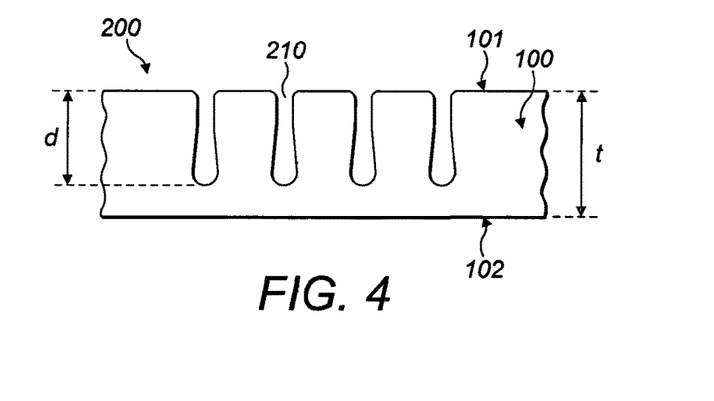
FIG. 4 shows a cross-section through a substrate formed using the method of FIG. 1.

As shown in FIG. 4, the surface 101 of a substrate 100 manufactured using the above method comprises a plurality of micro-channel openings 210 (these may be substantially uniform over the surface) which extend as a plurality of micro-channels 200 to a depth d, which may be slightly less than the thickness of the substrate 100 and which each extend in the same direction as all other micro-channels and of the substrate body. Owing to the direction in which the first solvent leaves the suspension 10, openings 210 are formed in the exposed side of the substrate 100.

The diameter of the openings 210 of the micro-channel 200 is preferably from 5 μm to 200 μm. As the micro-channels 200 terminate inside the substrate 100, a skin of solid substrate 100 may be provided on a portion of the outer surface 102 of the substrate 100. Preferably, the micro-channels 200 may extend up to 95% of the thickness t of the substrate 100.

A catalytically active coating may be deposited on the surfaces 101, 102 of the substrate 100. Advantageously, the micro-channels 200 provide a greater surface area for the coating to contact with the a fluid flowing over the surface of the substrate 100.

Figure 2A:
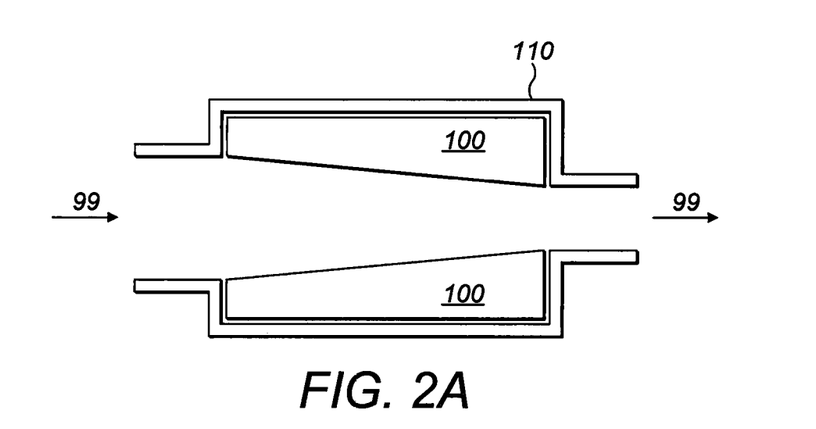
FIG. 2 shows simplified examples of catalytic convertors formed using the method of FIG. 1.

FIG. 2A shows a simplified example of a catalytic convertor. In this example, two substrate bodies 100 are provided within a housing 110. The substrate bodies 100 are provided in the form of sheets having a greater thickness at the downstream end of the catalytic convertor than at the upstream end of the catalytic convertor (the flow of exhaust gas is denoted by arrows 99). Thus, the substrate sheets 100 are tapered (this is shown in an exaggerated way in FIG. 2A). This structure can be easily manufactured by appropriately shaping the mould 20 used in the moulding step described above.

Figure 2B:
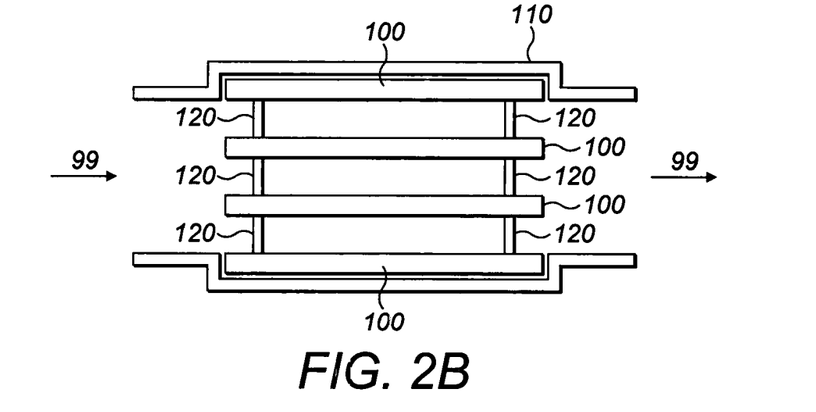

FIG. 2B shows a further simplified example of a catalytic convertor. In this example, a plurality of substrate bodies 100 in sheet-form are provided within a housing 110. The plurality of substrate bodies are separated by spacers 120. For example, one spacer 120 may be provided in each corner of a substrate sheet 100.

Preferably, the spacers will separate the sheets by a distance of from one to three times the thickness of the sheets. Preferably, the sheets are separated by double the sheet thickness.

Figure 2C:
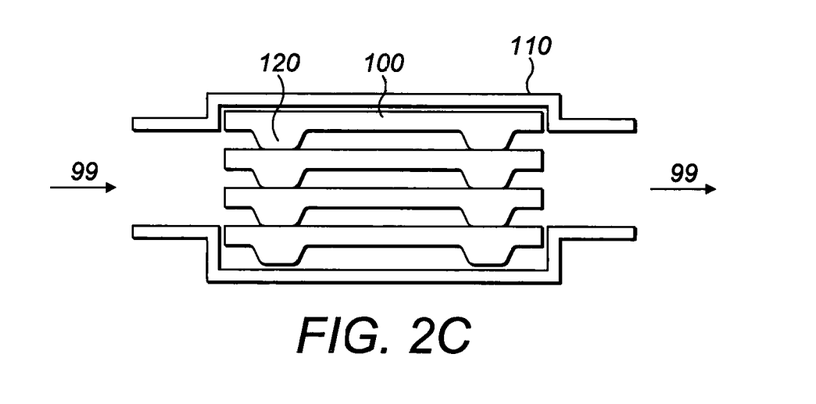

FIG. 2C shows a further simplified example of a catalytic convertor similar to the FIG. 2B example. In this example, the spacers 120 are formed integrally with the substrate sheet 100. This structure can be easily manufactured by appropriately shaping the mould 20 used in the moulding step described above.

Substrates having advantageous surface features such as those shown in FIGS. 3A to 3G may be manufactured by appropriately shaping the mould 20. While substrates in the form of a flat sheet of constant thickness are shown in FIG. 3, the surface features shown may be provided on the surface of any shape of substrate body by an appropriately shaped mould.

Figure 3A:
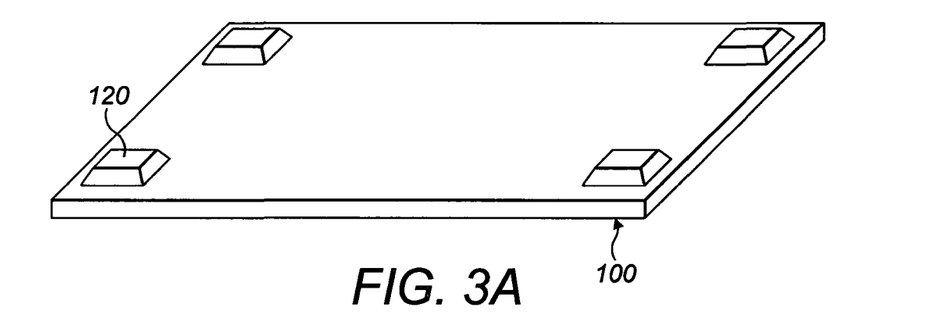
FIG. 3 shows surface features that can be formed using the method of FIG. 1.

FIG. 3A shows an example of a substrate body 100 having a plurality of spacers 120 formed on a major surface thereof.

Advantageously, a first substrate body 100 having a plurality of spacers 120 may be joined to a second substrate body 100 by placing the first substrate body 100 in contact with the second substrate body 100 prior to the above-described sintering step. The active of sintering can join the two first and second bodies 100 together to form a larger substrate.

Optionally, an additional adhesive may be provided between the two substrate bodies 100 prior to sintering in order to aid the adherence of one to the other. The adhesive may be a small quantity of the suspension 10.

In addition to shaping the mould 20 to provide structural features to aid construction of a catalytic convertor from one or more substrates 100, the mould 20 can be shaped to provide structural features that can modify the flow of a fluid (e.g. exhaust gas) over the surface of the substrate 100. It should however be noted that the principal direction of the flow will be unchanged by such flow modification features, which may only influence the flow locally.

Figure 3B:
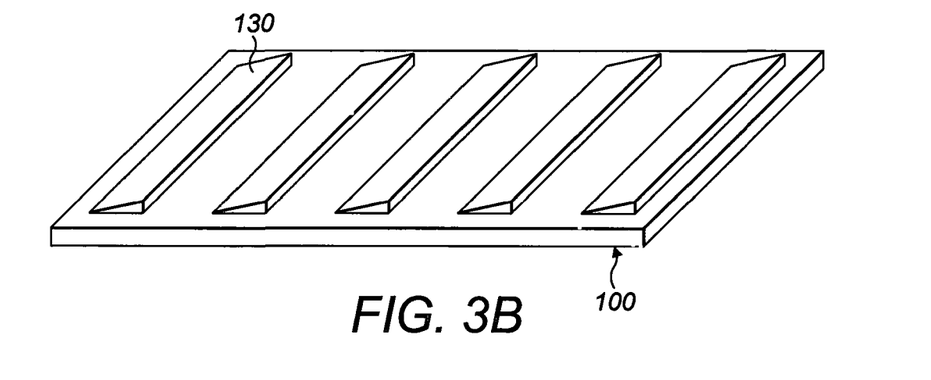

FIG. 3B shows an example of a substrate body 100 having a plurality of ridges 130 formed on a major surface thereof.

The ridges 130 can be configured so that a flow across the major surface becomes turbulent.

Figure 3C:
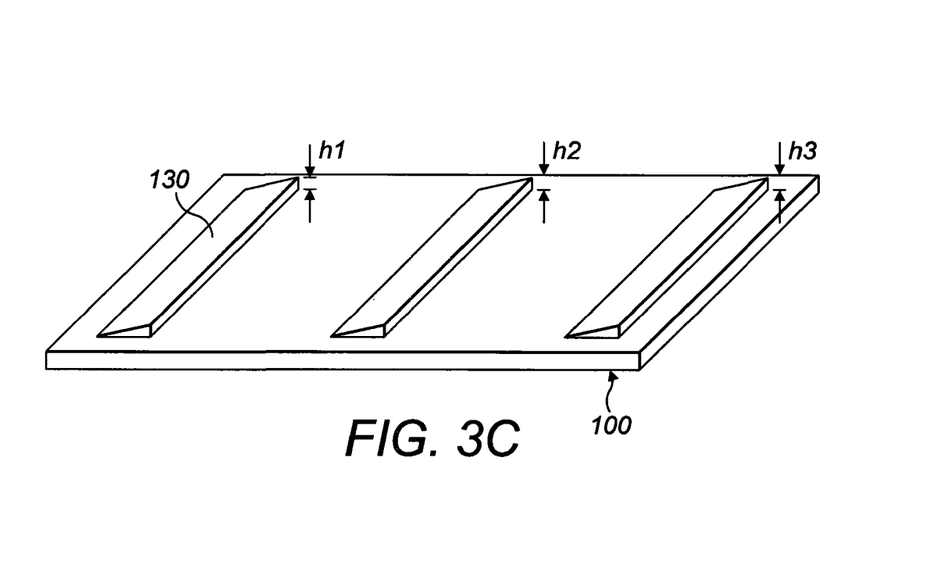

As shown in FIG. 3C, the ridges 130 may be formed with a varying height h1, h2, h3 across the length of the substrate 100.

Figure 3D:
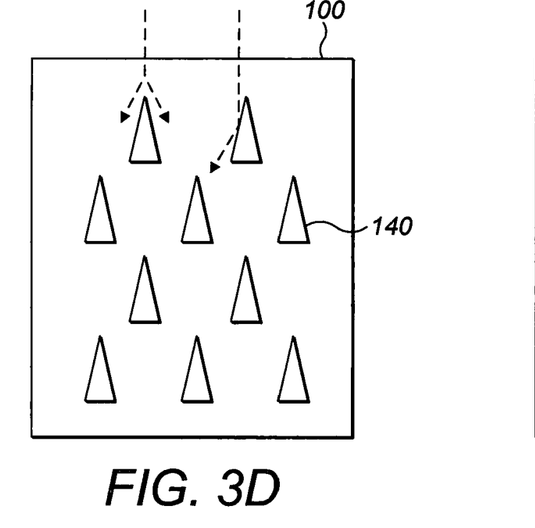

As shown in plan view in FIG. 3D, a plurality of protrusions 140 may be provided on the surface of the substrate 100. The protrusions 140 may partially redirect at least a portion of the flow of a fluid across the surface of the substrate 100 (as depicted by the dashed arrows in the figure).

The protrusions 140 may be generally triangular in cross-section (a cross-section parallel to the surface of the substrate).

Figure 3E:
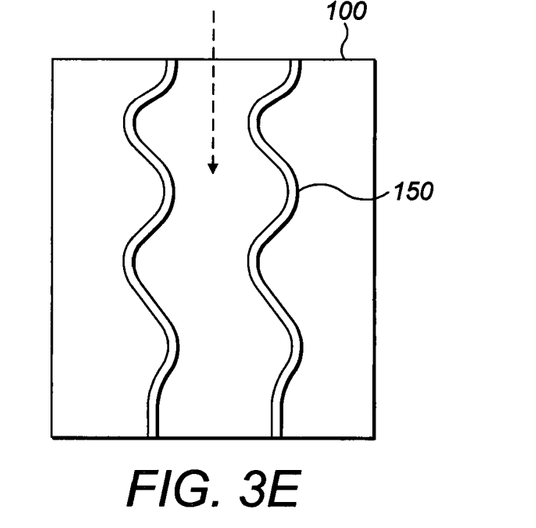

As shown in plan view in FIG. 3E, one or more ridges 150 may be provided. In contrast to the ridges 130, which are preferably not parallel with the principal flow direction (and, most preferably, generally perpendicular to the principal flow direction), ridges 150 may extend generally in the principal flow direction (depicted by the dashed arrow in the figure).

Optionally, the ridges 150 are not straight. For example, the ridges 150 shown in FIG. 3E are wavy. Similarly, ridges 130 may be wavy.

Figure 3F:
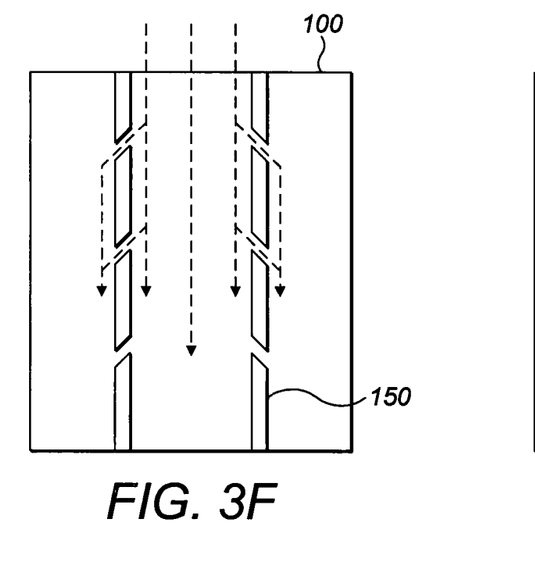

As shown in plan view in FIG. 3F, one or more ridges 150 may be non-continuous. For example, the ridges 150 may be provided with gaps through which a portion of the flow of a fluid may be redirected. Similarly, ridges 130 may be non-continuous.

Figure 3G:
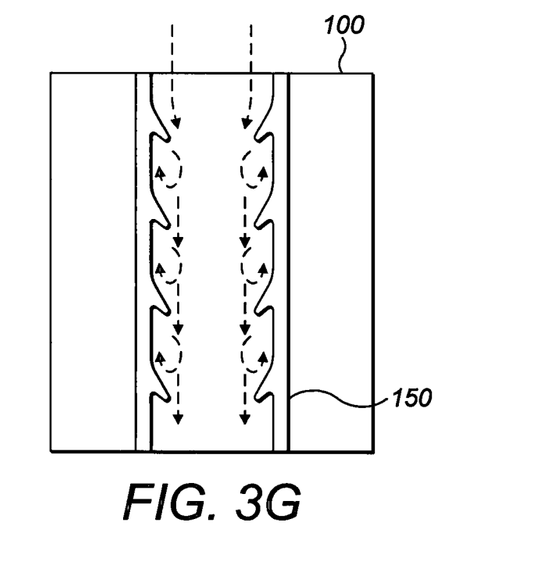

As shown in plan view in FIG. 3G, one or more ridges 150 may be provided with protrusions for creating eddies in the flow. Similarly, ridges 130 may have protrusions.

In general terms, the substrate 100 may comprise surface textures or flow modification structures over a portion of its surface. The characteristics of the surface textures or flow modification structures may vary across the surface.

If structural features 120, 130 are required on either side of a substrate body 100, then two complementary substrates 100 may be formed such that each has at least one planar surface and the structural features 120, 130 formed on other surfaces. The two planar surfaces may be joined prior to the sintering step.

Although the above description is focussed on the use of moulds for shaping the suspension 10 to form a green body, it is possible to extrude the suspension to form an elongate substrate body. Preferably, the suspension to is extruded form a non-tubular elongate substrate body.

The elongate substrate body can have any cross-sectional shape. For example, the substrate body may be a cylindrical rod. A catalytic convertor may comprise a plurality of such rods.

Such a method of manufacturing a substrate comprises: providing a suspension containing a substrate material in particulate form and a polymer in a first solvent (the suspension may comprise a catalytically active material); extruding the suspension; contacting the extruded suspension with a second solvent to remove at least some of the first solvent from the suspension and thereby form a green body having micro-channels from said substrate material and said polymer; removing at least a portion of a surface layer of said green body; and sintering the green body.

Since the extruded suspension can be contacted by the second solvent over its entire surface because it is not obstructed by a mould, openings will be formed on its surface. However, it is still beneficial in some cases to remove a portion of a surface layer in order to increase the opening area of the micro-channels. This can be done using any of the methods described herein.

A further method of manufacturing a catalytic convertor is to manufacture a catalytic convertor substrate using the methods described above, and then to break the sintered body (for example, by crushing or machining) to form a plurality of substrate pellets.

Owing to the beneficially high geometric surface area of the substrates 100 described above, they may be coated at least in part with a catalytically active coating (or be formed with catalytically active material) and used in a catalytic convertor.

Such catalytic convertors may be used in fixed applications or in vehicles. In particular, such catalytic convertors may be used in automobiles.

There follows a brief example of the steps of the method set out above.

Figure 5:
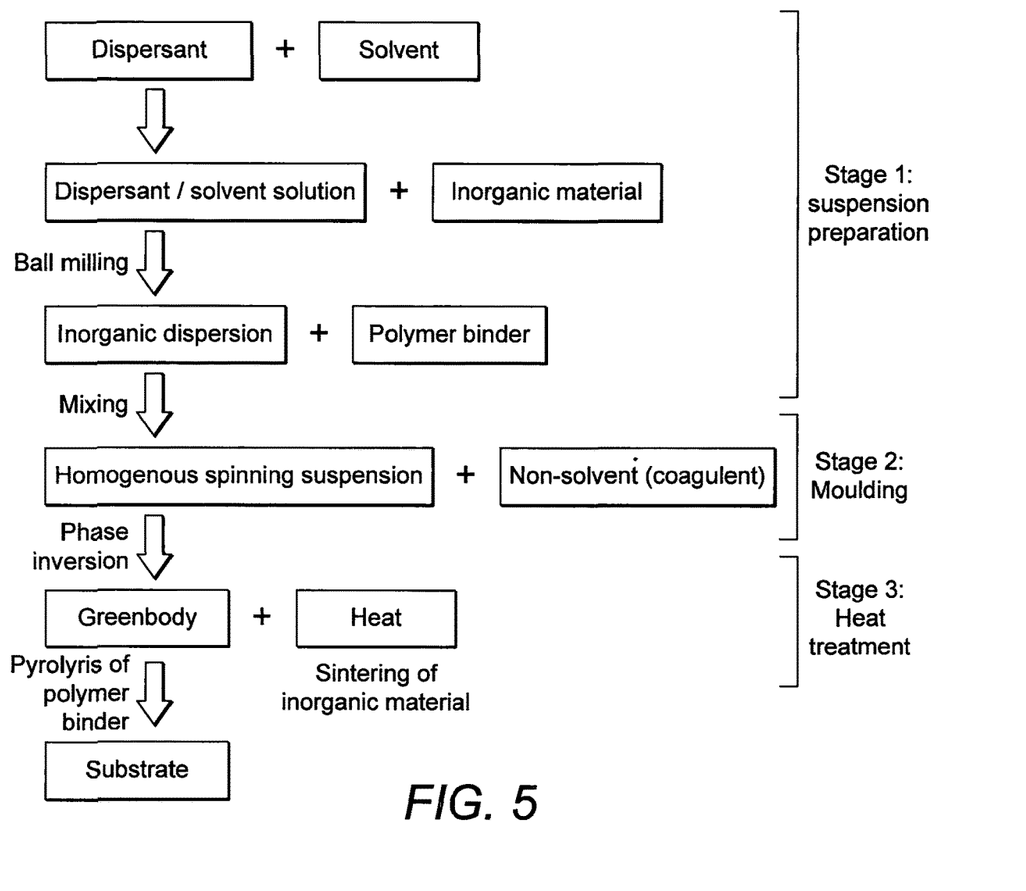
FIG. 5 shows an example of a method of manufacturing a substrate.

A flow diagram showing the stages involved in the preparation of a substrate is shown in FIG. 5. The parameters (A to U) for three examples are given below.

A dispersant (D) is dissolved in a solvent (C) prior to the addition of inorganic material (A). This forms a dispersion. In one embodiment, the inorganic material is in the form of a powder with a particle distribution of 1:2:7 (0.01 μm:0.05 μm:1 μm).

The dispersion is rolled/milled. For example, using 20 mm agate balls milling for 48 hours with approximately twice as much alumina/agate by weight as dispersion. A polymer binder (B) is added, after which milling may be continued for up to a further 48 hours.

Preferably, the resulting suspension is transferred to a gas tight reservoir and degassed under vacuum until no bubbles are seen at the surface.

The suspension is then introduced into a mould 20 or is extruded. When moulding is used, the mould 20 is submerged in a coagulation bath containing a non-solvent (K) for the polymer binder. When extrusion is used, the suspension may be extruded directly into the bath. If required, a different coagulant (I) may be used with a controlled flow rate (J).

The solvent (C) is miscible with the non-solvent (K).

The substrate may be left in the coagulation bath for an extended period (for example, overnight) to allow for completion of phase inversion of the polymer binder.

Preferably, the green body 15 is then immersed in an excess of water (e.g. tap water) replaced periodically over a period of 48 hours in order to remove traces of the solvent (C). Alternatively, a flow of water across the green body 15 may be provided.

Finally, the green body 15 is calcined in air with a predetermined sintering profile (L to P) to yield a ceramic substrate.

The sintering process reduces the size of the substrate.

This results in a substrate having the following properties: Thickness (S); Micro-channel length (T); and Micro-channel width (U).

The table below shows the parameters, A to U, for three examples

| Parameter | Example 1 | Example 2 | Example 3 |
|---|---|---|---|
| A | Yttrium-stabilized zirconia (44 wt %) | Aluminium oxide(60 wt %) | Aluminium oxide(60 wt %) |
| B | Polyether sulfone (8 wt %) | Polyether sulfone (6 wt %) | Polyether sulfone (6 wt %) |
| C | N-methyl-2-pyrrolidone (33 wt %) | N-methyl-2-pyrrolidone (34 wt %) | Dimethyl sulfoxide (34 wt %) |
| D | polyethylene glycol (15 wt %) | Arlacel P135 (0.001 g/m$^2$) | Arlacel P135 (0.001 g/m$^2$) |
| J | 12 ml/min | 3 ml/min | 5 ml/min |
| K | water | water | water |
| L | Room temperature to 600° C. at 2° C./min | Room temperature to 600° C. at 2° C./min | Room temperature to 600° C. at 2° C./min |
| M | Dwell for 2 hours | Dwell for 2 hours | Dwell for 2 hours |
| N | 600 to 1400° C. at 5° C./min | 600 to 1450° C. at 5° C./min | 600-1450° C. at 5° C./min |
| O | Dwell for 4 hours | Dwell for 4 hours | Dwell for 4 hours |
| P | 1400° C. to room temperature at 5° C./m | 1450° C. to room temperature at 5° C./min | 1450° C. to room temperature at 5° C./min |
| S | 0.3 mm | 0.3 mm | 0.85 mm |
| T | 0.3 mm (100% of fibre wall) | 0.28 mm (93% of fibre wall) | 0.67 mm (78% of fibre wall) |
| U | 0.02 mm | 0.02 mm | 0.07 mm |

In a further exemplary embodiment, the following method was used:

Arlacel P135 at a concentration of 1.3 wt % was dissolved in NMP/water solutions (having 95 wt % N-methyl-2-pyrrolidone and 5 wt % water) prior to the addition of aluminium oxide powders (58.7 wt %) at a ratio of 1:2:7 (for mean particle sizes 0.01 μm:0.05 μm:1 μm) The dispersion was rolled/milled with 20 mm agate milling balls with an approximate alumina/agate weight ratio of 2 for 48 hours. Milling was continued for a further 48 hours after the addition of polyether sulfone (6.1 wt %). The suspension was then transferred to a gas tight reservoir and degassed under vacuum until no bubbles could be seen at the surface.

After degassing, the suspension was introduced into a mould 20 and submerged in a coagulation bath containing 120 litres of water (a non-solvent for the polymer).

The substrate was left in the coagulation bath overnight to allow for completion of phase inversion. The green body 15 was then immersed in an excess of tap water which was replaced periodically over a period of 48 hours in order to remove traces of NMP. Finally, the green body 15 was calcined in air (CARBOLITE furnace) to yield a ceramic substrate. The temperature was increased from room temperature to 600° C. at a rate of 2° C./min and held for 2 hours, then to the target temperature (1200° C. to 1600° C.) at a rate of 5° C./min and held for 4 hours. The temperature was then reduced to room temperature at a rate of 5° C./min.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A catalytic convertor comprising:
a substrate body including a first surface, a second surface located opposite the first surface, and a plurality of microchannels including openings on the first surface, each microchannel of the plurality extending in a same direction toward the second surface as all other microchannels of the plurality and of the substrate body, the substrate body arranged within the catalytic convertor such that a principal flow of fluid through the catalytic convertor flows along the first surface of the substrate body,
wherein:
the substrate body and at least a portion of the first surface comprises a catalytically active material;
the openings having widths falling in the range 5 μm to 200 μm;
the substrate body is in the form of a sheet; and
the sheet has a thickness and the microchannels extend at least 80% of the sheet thickness.

2. The catalytic convertor of claim 1 comprising a plurality of surface structures protruding from the outer surface of the substrate body.

3. The catalytic convertor of claim 1 wherein at least a portion of the substrate body has a textured surface.

4. The catalytic convertor of claim 1 comprising a plurality of sheets of substrate.

5. The catalytic convertor of claim 4, further comprising a plurality of spacers for supporting the plurality of sheets in a spaced arrangement.

6. The catalytic convertor of claim 5, wherein the spacers are formed integrally with the sheets.

7. The catalytic convertor of claim 4, wherein the plurality of sheets are arranged to extend substantially in parallel.

8. The catalytic convertor of claim 4, wherein the plurality of sheets are spaced by one to three times the width of the sheets.

9. The catalytic convertor of claim 1, wherein the substrate comprises ceramic.

10. The catalytic converter of claim 1, wherein the substrate comprises one or more of cordierite; zirconia; yttrium stabilised zirconia; titania; silicon carbide; clay; alumina; stainless steel, FeCr alloys; alloys of iron; alloys of aluminium; or sintered metals.

11. The catalytic converter of claim 1, wherein the microchannels have an entrance diameter of 20 μm to 70 μm.

12. The catalytic convertor of claim 1, wherein the substrate body is formed of a material comprising the catalytically active material.

13. The catalytic convertor of claim 1, wherein the substrate body or at least one major surface of the sheet is coated with a catalytically active coating.

14. The catalytic convertor of claim 1 wherein said sheet is curved in the form of a spiral.

15. The catalytic convertor of claim 1, the catalytically active material including a platinum group metal.

16. The catalytic convertor of claim 1, wherein said second surface is a solid surface.

17. The catalytic convertor of claim 1, the plurality of micro-channels being substantially uniform channels.

18. A catalytic convertor substrate having a plurality of microchannels each extending in a same direction from a first surface toward a second surface as all other microchannels of the plurality and of the substrate body, each microchannel has an opening having widths falling in the range 5 μm to 200 μm on the first surface formed by providing a suspension containing a substrate material in particulate form and a polymer in a first solvent, the substrate material comprises a catalytically active material;
introducing the suspension into a mould or extruding the suspension;
contacting the suspension with a second solvent to remove at least some of the first solvent from the suspension and thereby form a green body having the micro-channels and said polymer;
removing at least a portion of a surface layer of said green body;
sintering the green body;
forming the green body into a sheet having a thickness; and
forming the micro-channels to extend at least 80% of the sheet thickness.

19. The method of claim 18, wherein the sintering is conducted before the removing.

20. A catalytic convertor comprising:
a substrate body arranged within the catalytic convertor such that a principal flow of fluid through the catalytic convertor flows along a first surface of the substrate body,
wherein:
the substrate body comprises a catalytically active material, a second surface located opposite that of the first surface, and a plurality of microchannels, each microchannel being substantially uniform extending in a same direction toward the second surface from the first surface; as all other microchannels of the plurality and of the substrate body,
said first surface of the substrate body has a plurality of openings to the micro-channels, the openings having widths falling in the range 5 μm to 200 μm; and at least a portion of said surface comprises a catalytically active coating;
the substrate body is in the form of a sheet having a thickness; and
the micro-channels extend at least 80% of the sheet thickness.

* * * * *